United States Patent [19]

Higashiyama et al.

[11] Patent Number: 4,525,828
[45] Date of Patent: Jun. 25, 1985

[54] OPTICAL MAGNETIC RECORDING DEVICE

[75] Inventors: Yasushi Higashiyama; Shu Chiba; Norikazu Sawazaki, all of Yokohama, Japan

[73] Assignee: Tokyo Shibaura Denki Kabushiki Kaisha, Kawasaki, Japan

[21] Appl. No.: 359,808

[22] Filed: Mar. 19, 1982

[30] Foreign Application Priority Data

Mar. 24, 1981 [JP] Japan .................. 56-42911

[51] Int. Cl.$^3$ .................. G11B 7/12; G11B 11/14
[52] U.S. Cl. .................. 369/111; 369/13; 369/112; 346/76 L; 360/59
[58] Field of Search .................. 369/100, 13, 118, 112, 369/111; 360/59; 358/290; 346/76 L, 108

[56] References Cited

U.S. PATENT DOCUMENTS

| | | | |
|---|---|---|---|
| 2,923,781 | 2/1960 | Gordon | 369/118 |
| 3,314,074 | 4/1967 | Becker | 346/108 |
| 3,588,218 | 6/1971 | Hunt et al. | 350/7 |
| 3,668,671 | 6/1972 | Everett | 360/21 |
| 3,688,025 | 8/1972 | Whittemore, Jr. | 178/6.6 R |
| 3,821,787 | 6/1974 | Kihan | 360/33.1 |
| 3,823,276 | 7/1974 | Maslowski et al. | 179/100.3 B |
| 3,969,765 | 7/1976 | Roos | 360/59 |
| 4,212,037 | 7/1980 | Lemelson | 360/33 |

FOREIGN PATENT DOCUMENTS 891622 1/1953 Fed. Rep. of Germany .
8100165 1/1981 Japan .

OTHER PUBLICATIONS

IBM Technical Disclosure Bulletin, vol. 15, No. 6, Nov. 1972, pp. 1790–1791, New York, USA.

Primary Examiner—Alan Faber
Attorney, Agent, or Firm—Oblon, Fisher, Spivak, McClelland & Maier

[57] ABSTRACT

An optical recording device for forming recording tracks of an indented pattern on a magnetic recording tape comprises a rotary drum which has at least two windows, the magnetic recording tape being driven obliquely on the windows along an outer surface of the drum, and an optical system, disposed inside the rotary drum, for converting a modulated laser beam incident on the optical system into two slit beams, major axes of sections of which form a predetermined angle and for emitting the slit beams on the magnetic recording tape through the windows, whereby the recording tracks of the indented pattern in correspondence with the signal are formed obliquely on the magnetic recording tape with respect to a longitudinal direction of the magnetic recording tape by the slit beams so as to form different azimuths between adjacent recording tracks.

10 Claims, 23 Drawing Figures

OPTICAL MAGNETIC RECORDING DEVICE

BACKGROUND OF THE INVENTION

The present invention relates to an optical recording device for forming an indented pattern on a master magnetic recording tape.

A system for recording a video signal, an audio signal or the like on a magnetic recording medium and for playing it back, using a magnetic head, is widely adopted at present. However, this system is not satisfactory in consideration of low recording density and low S/N ratio.

On the other hand, video discs are recently developed wherein signals are recorded in an indented pattern using a laser beam or an electron beam and the recorded signals are reproduced mechanically, electrostatically, or optically. Such video discs are almost commercially available. An indented pattern in the order of submicrons can be easily formed in accordance with recent laser beam and electron beam techniques. A video disc of this type can perform recording/playback with high density and high S/N ratio. However, a special playback device is required for this video disc in order to reproduce the recorded signals. Such a playback device is very expensive as compared with currently used magnetic recording/playback devices.

In order to solve this problem with the conventional video disc, the present inventors proposed a system wherein signals are recorded in an indented pattern on a first magnetic recording medium and the recorded signals on the first magnetic recording medium are magnetically transferred to a second magnetic recording medium by bringing the first magnetic recording medium into contact with the second magnetic recording medium and by applying a magnetic field to the first and second magnetic recording media. According to this system, since the indented pattern corresponding to the signals recorded on the first magnetic recording medium can be formed in the order of submicrons, the signals transferred and recorded on the second magnetic recording medium are very high in recording density. Further, recording on the second magnetic recording medium is performed magnetically, so that playback can be, in principle, performed by conventional magnetic recording/playback device.

As a recording/playback device of a video signal, a helical scan type VTR is mostly used wherein the recording tracks (video tracks) for the video signal are inclined by a rotary head mechanism with respect to the longitudinal direction of the magnetic recording tape. Therefore, when the playback operation is to be performed using this helical scan type VTR, the signals which are transferred and recorded on the second magnetic recording tape as the second magnetic recording medium in accordance with the magnetic transfer recording system as described above must be recorded in an inclined recording track with respect to the longitudinal direction of the magnetic recording tape. For this purpose, the signals which are recorded in the indented pattern on the first magnetic recording tape as the first magnetic recording medium must be also recorded in a recording track inclined with respect to the second magnetic recording tape.

In the conventional VTR, an azimuth recording system is mostly adopted to further increase the recording density. According to this system, an inclined angle (azimuth) of an elongate magnetization pattern with respect to the longitudinal direction of a recording track differs from that of an adjacent recording track so as to reduce crosstalk between the recording tracks. Thus, a guard band between the recording tracks is eliminated to increase the recording density. Therefore, when adaptability of the present invention to a VTR with the azimuth recording system of this type is considered, for each recording track, the signals of the indented pattern must be recorded on the first magnetic tape at an azimuth different from an azimuth at which the signals are recorded on the second magnetic tape.

SUMMARY OF THE INVENTION

It is an object of the present invention to provide an optical recording device for optically recording a signal in an indented pattern with high density and for forming recording tracks of indented patterns such that adjacent recording tracks have different azimuths with respect to a longitudinal direction of a magnetic recording tape.

An optical recording device according to the present invention has an optical system, disposed inside a rotary drum which has at least two windows, for converting an incident modulated laser beam to at least two slit beams, major axes or longer sides of sections of which have a predetermined angle with each other, and for emitting them through windows on the magnetic recording tape which is driven along an outer circumference of the rotary drum.

The slit beam according to the present invention is defined as the beam, the section of which is of rectangular or elliptical shape. Thus, the section of the slit beam has a major axis (or longer sides) and a minor axis (or shorter sides). This beam may be preferably shaped by a cylindrical lens or a slit.

BRIEF DESCRIPTION OF THE DRAWINGS

FIGS. 9A and 9B to 11A and 11B are views for explaining the mode of operation of a focus control unit of the optical recording device of FIG. 8.

DETAILED DESCRIPTION OF THE PREFERRED EMBODIMENTS

An optical recording device according to one embodiment of the present invention will be described with reference to the accompanying drawings.

Figure 1:
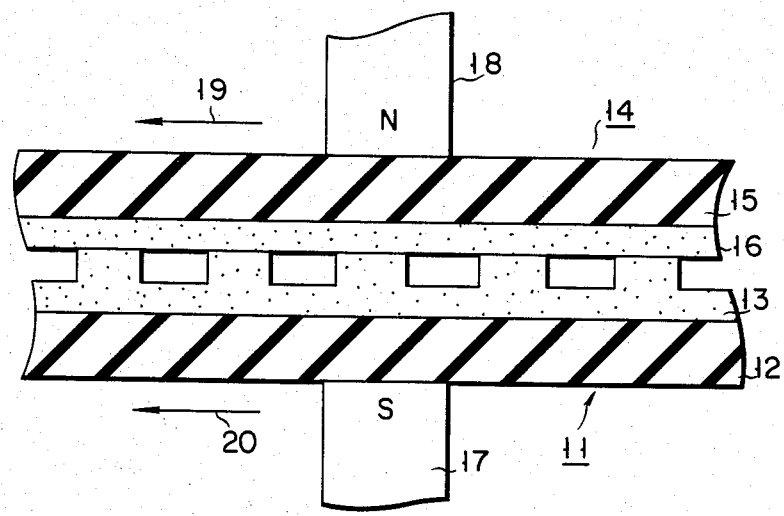
FIG. 1 is a sectional view for explaining a method for transferring signals recorded by an optical recording device on a first magnetic recording tape to a second magnetic recording tape according to one embodiment of the present invention.

Referring to FIG. 1, a process will be described wherein an indented pattern signal recorded on a master or first magnetic recording tape is transferred to a second magnetic recording tape by an optical recording device. Reference numeral 11 denotes a first magnetic recording tape which comprises a base layer 12 of a synthetic resin and a magnetic body layer 13 on which a signal is recorded in an indented pattern. Reference numeral 14 denotes a second magnetic tape which comprises a base layer 15 and a magnetic body layer 16 on which the signal is not recorded, that is, which has a flat surface. When the signal on the first magnetic recording tape 11 is to be transferred to and recorded on the second magnetic recording tape 14, the surface of the magnetic body layer 13 is placed in contact with that of the magnetic body layer 16. Further, the first and second magnetic recording tapes 11 and 14 are passed between a pair of magnets 17 and 18 which are so mounted that opposite poles thereof oppose each other. Thus, the magnets 17 and 18 oppose each other through the first and second magnetic recording tapes 11 and 14. A DC magnetic field is applied across the first and second magnetic recording tapes 11 and 14 in the direction of their thickness. They are moved in the track direction indicated by arrows 19 and 20 relative to the magnets 17 and 18. As a result, a magnetic pattern corresponding to the indented pattern formed on the magnetic body layer 13 of the first magnetic recording tape 11 is formed on the magnetic body layer 16 of the second magnetic recording tape 14, thus performing magnetic transfer recording. In this case, the magnetic body layer 16 may be uniformly magnetized, in advance, by a magnetic field opposite to that of the magnets 17 and 18. The direction of the magnetization of the magnetic body layer 16 may be inverted in accordance with the indented pattern of the magnetic body layer 13 of the first magnetic recording tape when magnetic transfer recording is performed.

Various modifications of the the transfer process described above may be considered. This process is not directly related to the scope of the present invention. For example, the magnetic field for transfer process may be an AC magnetic field or a composite magnetic field of DC and AC magnetic fields. The direction for applying such a magnetic field may be normal to the surface of the magnetic recording tape, or parallel to the travel direction thereof. Further, the magnetic body layer 13 of the first magnetic recording tape 11 may be magnetized, in advance, to improve the transfer efficiency.

Figure 2:
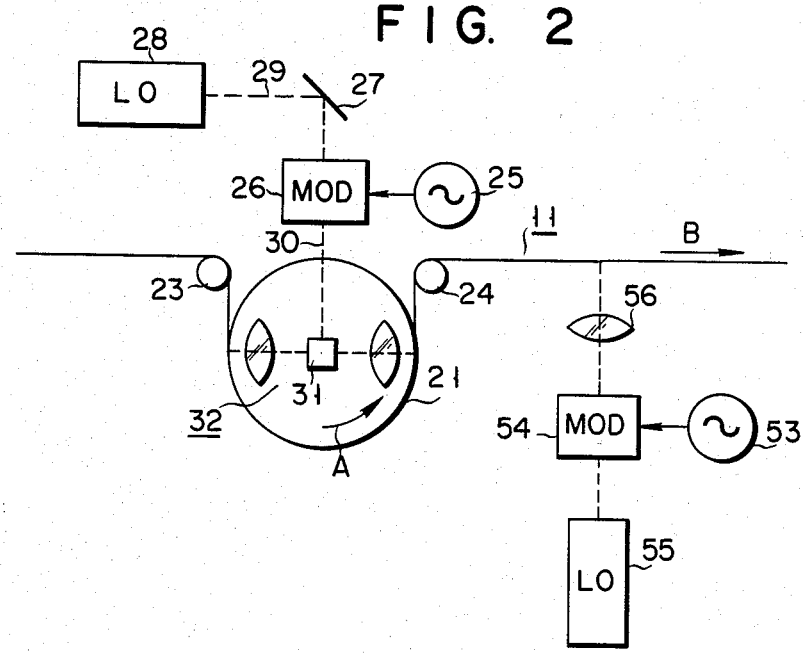
FIG. 2 is a view schematically illustrating the overall structure of the optical recording device.
Figure 3:
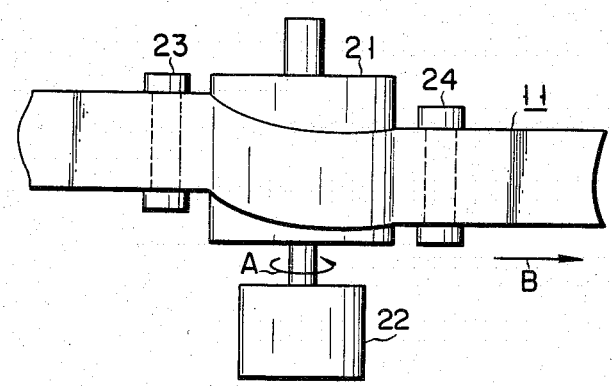
FIG. 3 is a partially enlarged front view of the optical recording device according to the present invention.

A general description of the optical recording device will be made with reference to FIGS. 2 and 3.

Referring to the figures, reference numeral 21 denotes a rotary drum which is driven about its central axis in the direction indicated by an arrow A by a rotary drive unit 22. The first magnetic recording tape 11 is guided by head guides 23 and 24 and driven by a tape drive mechanism (not shown) which comprises a capstan and a pinch roller along the outer circumference of the rotary drum 21 in the direction indicated by an arrow B.

An electric signal to be recorded which is generated by a signal processing circuit 25 is supplied to a light modulator 26. Thus, a laser beam 29 guided from a laser oscillator 28 through a mirror 27 is modulated in response to the electric signal described above. In particular, the intensity of the laser beam is changed in response to the electric signal. In this manner, a laser beam 30 modulated in the light modulator 26 is guided to an optical system 32 disposed inside the rotary drum 21 through a mirror 31.

The structure of the optical system 32 will be described in detail with reference to FIG. 4.

The rotary drum 21 has a cylinder 21a with a bottom. A rotating shaft 22a of the rotary drive unit 22 is coaxially mounted at the center of the bottom surface of the cylinder 21a. A light guide or cylinder 21b of a small diameter is coaxially disposed at the center of the upper wall of the cylinder 21a. In the cylinder 21b, two cylindrical lenses 33a and 33b are disposed so as to be aligned with the optical axis of a laser beam 30 reflected from the mirror 31. A convex lens 34 for light dispersion, a beam splitter 35, a quarter-wave plate 40 and a mirror 41 are disposed below the cylindrical lenses 33a and 33b on the optical axis in the order named. The beam splitter 35 transmits downward part of the laser beam 30 which is incident thereon from the above through the lens 34. The beam splitter 35 further reflects the other part of the laser beam 30 in one direction along a horizontal plane and reflects a laser beam which is incident thereon from below in a direction opposite to the above-described one direction on the same horizontal plane. The transmitted laser beam is circularly polarized in the quarter-wave plate 40. The polarized laser beam is incident on the horizontal mirror 41 and reflected so that the laser beam is incident on the quarter-wave plate 40 again. At this time, the laser beam is circular polarized by the quarter-wave plate 40 in a direction opposite to the previous polarization and is incident on the beam splitter 35. The laser beam is then reflected at an angle of reflection of 90°. This reflected laser beam which has a plane of polarization perpendicular to that of the polarized laser beam which is incident on the beam splitter 35 from the above. Focusing lenses 36 and 37 are respectively disposed on both sides of the beam splitter 35. Windows 38 and 39 are respectively disposed on the circumferential wall of the cylinder 21a. The beam splitter 35, the focusing lenses 36 and 37 and the windows 38 and 39 are aligned on the same optical path. The two laser beams which are reflected in opposite directions by the beam splitter 35 and which have planes of polarizations perpendicular to each other are respectively focused by the focusing lenses 36 and 37 and emitted outside the cylinder 21a through the windows 38 and 39. The first magnetic recording tape 11 is driven along the circumferential surface of the cylinder 21a so as to close the windows 38 and 39. The magnetic body layer 13 of the first magnetic recording tape 11 is thus scanned by the laser beams which are emitted through the windows 38 and 39. As a result, an indented pattern corresponding to the signal generated by the signal processing circuit 25 is formed on the magnetic body layer 13.

Figure 4:
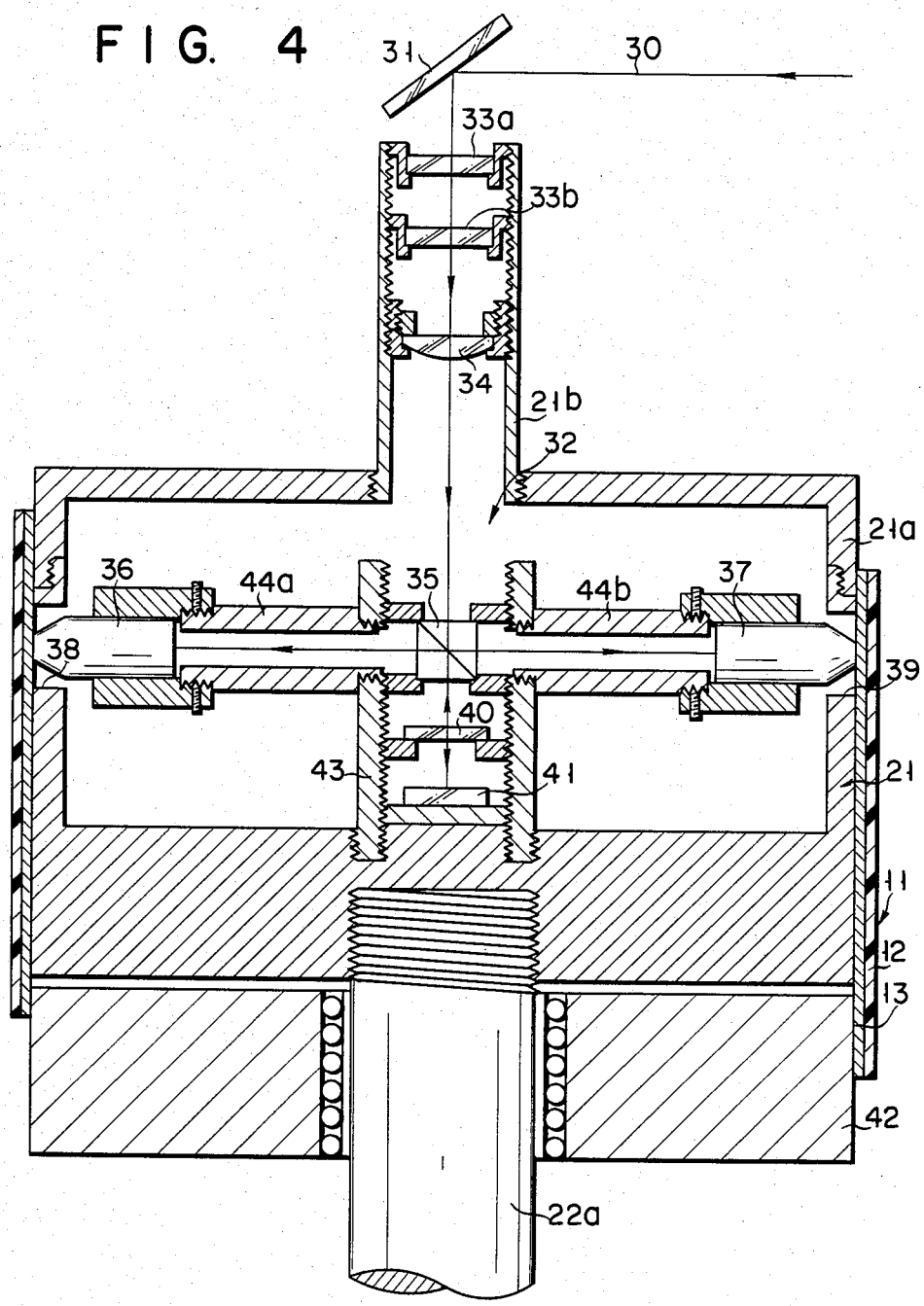
FIG. 4 is a sectional view of a rotary drum of the optical recording device according to the present invention.

Referring to FIG. 4, reference numeral 42 denotes a stationary drum which is coaxially disposed below the rotary drum 21 and which has the same outer diameter as the rotary drum 21. Reference numeral 43 denotes a vertical guide cylinder which is coaxial with the cylinder 21b of the rotary drum 21 and which has the beam splitter 35, the quarter-wave plate 40 and the mirror 41. Reference numerals 44a and 44b denote horizontal guide cylinders which hold the lenses and are arranged so that the lenses are free to move along the optical axis and which define optical path between the beam splitter 35 and the lens 36 and the beam splitter 35 and the lens 37, respectively. Female threads are formed on the inner circumference of the cylinder 21b. The cylindrical lenses 33a and 33b and the convex lens 34 are respectively held in a holding portion which, in turn, engages with the female threads. Thus, the cylindrical lenses 33a and 33b and the convex lens 34 are free to move along the optical axis.

A plurality of grooves are formed on parts of the outer circumferences of the rotary drum 21 and the stationary drum 42 which are brought into slidable contact with the magnetic recording tape. An air film is formed between the grooves and the magnetic recording tape 11, thus reducing wear on the magnetic recording tape 11. If the pair of lenses 36 and 37 are of the same type and are be disposed to be symmetrical about the beam splitter 35, irregular rotation owing to the unbalanced weight of the rotary drum may be eliminated.

Figure 5:
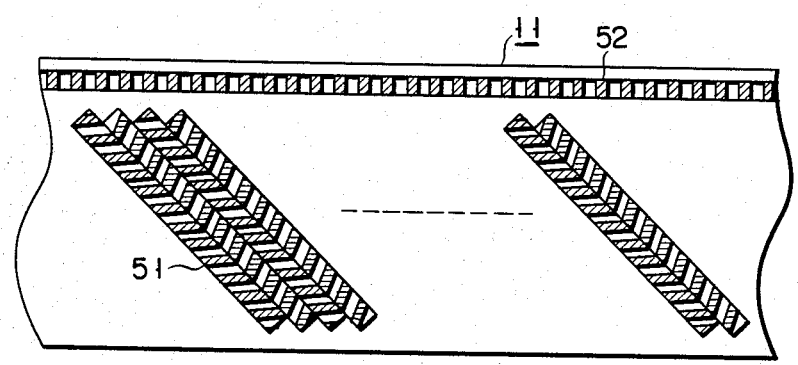
FIG. 5 is a plan view of the magnetic recording tape on which signals are recorded with the optical recording device according to the present invention.

In the optical recording device with the above structure, the first magnetic recording tape is driven obliquely on the outer circumference of the rotary drum 21 when the optical recording device is operated. As a result, the first magnetic recording tape 11 is radiated with the laser beam along a retrace line which is inclined with respect to the longitudinal direction of the first magnetic recording tape 11. Therefore, a signal is recorded on a recording track 51 of the magnetic body layer 13 of the first magnetic recording tape 11 in an indented pattern. The recording track 51 is inclined with respect to the longitudinal direction of the first magnetic recording tape 11, as shown in FIG. 5. The recessed portions of the recording track 51 are indicated by the hatched portions and the projecting portions of the recording track 51 are indicated by the blank portions. Odd numbered tracks among the recording tracks 51 are formed by the laser beam transmitted through the first focusing lens 36, while even numbered tracks thereamong are formed by the laser beam transmitted through the second focusing lens 37. The indented pattern of the recording track 51 is inclined with respect to the longitudinal direction, as shown in FIG. 5. Further, inclined angles (azimuths) of adjacent recording tracks are different. When the indented pattern is formed in this manner, magnetic transfer recording is performed in the same manner as in the azimuth recording system which performs magnetic transfer recording with a VTR on the magnetic body layer 16 of the second magnetic recording tape 14. Therefore, crosstalk does not occur even if guard bands between the recording tracks are removed, thus allowing magnetic transfer recording with high density.

As described above, in order to record the indented signal on the magnetic body layer 13 of the first magnetic recording tape 11 in such a manner that the adjacent recording tracks may have different azimuths, the optical system 32 must be disposed so that the major axes of the beams radiated on the first magnetic recording tape 11 through the first and second focusing lenses 36 and 37 have a predetermined angle with respect to the optical axis extending from the reflecting mirror 31 to the beam splitter 35. In the above embodiment, the laser beam is shaped by the cylindrical lenses 33a and 33b. Only one cylindrical lens is required for shaping and the other lens is used for shortening the optical path. Even if these two cylindrical lenses are used in this manner, the width a pattern extending in the direction indicated by longitudinal axial directions of these lenses need not be the same. These axes may form a proper angle, for example, 90°.

Figure 6:
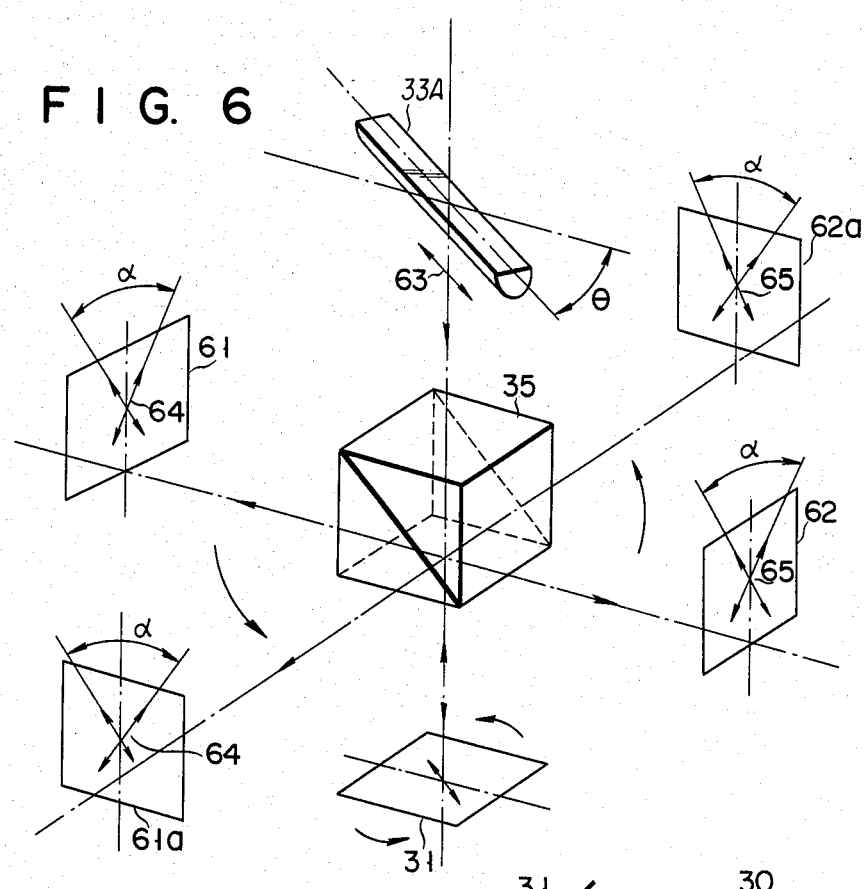
FIG. 6 is a perspective view for explaining the recorded state of signals on the magnetic recording tape with an optical system disposed inside the rotary drum.

The mode of operation of the cylindrical lens for shaping, for example, the cylindrical lens 33a will be described in detail with reference to FIG. 6.

The flat surface of the cylindrical lens 33a faces upward in the horizontal direction. The axis of the cylindrical lens 33a has a predetermined angle $\theta$ with respect to the optical axis extending from the beam splitter 35 to the focusing lens 37. Reference numerals 61 and 62 denote light-receiving surfaces on the first magnetic recording tape 11 which receive the laser beams focused by the first and second focusing lenses 36 and 37. Reference numerals 61a and 62a denote light-receiving surfaces of the first magnetic recording tape 11 when the rotary drum 21 rotates through 90°. The laser beam which becomes an elliptical laser beam, the direction of the major axis of which is indicated by an arrow 63, is split into two directions by the beam splitter 35 or light splitting means. One of the split laser beams is radiated on the light-receiving surface 61 on the side of the first focusing lens 36 with a pattern extending in the direction indicated by a broken arrow 64. The other split laser beam is radiated on the light-receiving surface 62 on the side of the second focusing lens 37 with a pattern extending in the direction indicated by a solid arrow 65. When the rotary drum 21 rotates through 90° in this condition, the laser beams are radiated on the light-receiving surfaces 61a and 61b in the same manner as the light-receiving surfaces 61 and 62. The relation between the light-receiving surfaces and the radiated patterns is established regardless of the rotating angle of the rotary drum 21. The light-receiving surfaces 61 and 62 correspond to an angle (azimuth) corresponding to the longitudinal direction of the indented pattern on the odd numbered and even numbered recording tracks on the first magnetic recording tape 11. An angle formed by a line indicated by the arrow 64 and a line indicated by the arrow 65, that is, an azimuth difference $\alpha$ of the indented patterns of the odd numbered recording track and the even numbered recording track is given as $\alpha = 2\theta$. Since the axis of the cylindrical lens 33 is inclined at a predetermined angle $\theta$ with respect to the optical axis extending from the beam splitter to the focusing lens, the adjacent recording tracks comprising the indented patterns on the first magnetic recording tape 11 have different azimuths, the angular difference of which is $2\theta$.

In the optical recording device according to the first embodiment of the present invention, in addition to the signal by the signal processing unit 25, a signal processing unit 53 which generates a different signal such as an audio signal is disposed. The signal generated by the signal processing unit 53 is recorded in an indented pattern on the recording track along the travelling direction of the first magnetic recording tape 11. The signal from the signal processing unit 53 is supplied to a light modulator 54 in FIG. 2 and a laser beam from a laser oscillator 55 is modulated in response to the signal. In particular, the intensity of the laser beam is changed in response to the signal from the signal processing unit 53. The laser beam modulated in the light modulator 54 is focused by a focusing lens 56. The focused laser beam becomes incident on the magnetic body layer 13 and a signal is recorded on a recording track 52 of the magnetic recording tape 11 in an indented pattern, as shown in FIG. 5. As described above, recording of another signal such as an audio signal generated by the second signal processing unit 53 may be performed after the signal generated by the first signal processing unit 25 is recorded. The signal generated by the second signal processing unit 53 may be recorded without using the laser beam. Another kind of recording method such as a method using an electrical/mechanical conversion type recording head may be used.

In current VTRs, the video signal is recorded as an FM (frequency modulation) signal. On the other hand, an audio signal is recorded by a high frequency bias recording method. According to the embodiment of the present invention, since the signal from the first signal processing unit 25 is an FM signal, the signal can be recorded in the indented pattern. However, the signal from the second signal processing unit 53 cannot be recorded in the indented pattern if this audio signal is not modulated. When the audio signal from the second signal processing unit 53 is modulated to an audio signal by PWM (pulse width modulation), FM or PM (phase modulation), the modulated audio signal can be recorded in the indented pattern. Especially, when PWM is used and when the carrier frequency is set outside the range of the playback frequency, only the audio signal can be automatically played back because of the filter effect, when the signal which is transferred and recorded on the second magnetic recording tape 14 is to be reproduced. Thus, the audio signals can also be reproduced with a conventional magnetic recording/playback device such as a VTR without requiring modifications. Since the audio signals recorded on the second magnetic recording tape 14 have the magnetization pattern which changes in a binary manner in correspondence with the indented pattern on the first magnetic recording tape 11, the audio signals transfer-recorded and played back in this manner have an improved S/N ratio over that obtainable with a conventional analog magnetic recording device. A still better S/N ratio may be obtained with a modulation method such as FM or PM although a demodulator is required as an adaptor for the audio signals. If the output signals from the first signal processing unit 25 are the audio signals, they may be recorded after similar modulation.

Figure 7:
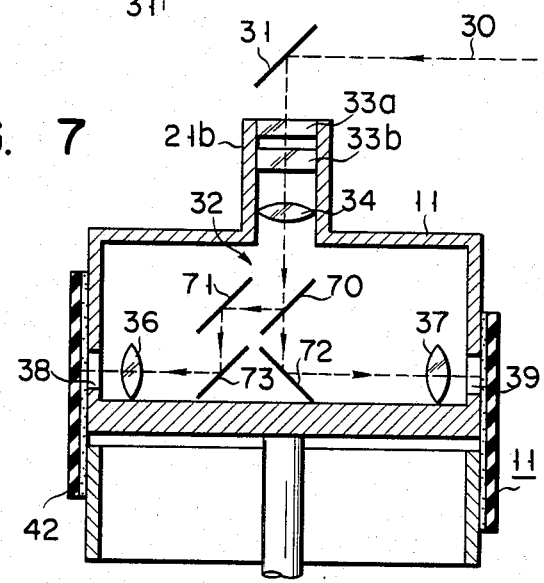
FIG. 7 is a sectional view of a rotary drum of an optical recording device according to another embodiment of the present invention.

FIG. 7 shows a modification of the optical system 32 of the magnetic transfer recording device according to the present invention. Reference numeral 70 denotes a half mirror which is inclined by an angle of 45° with respect to the optical axis of the convex lens 34. The laser beam is incident on the half mirror 70 through the convex lens 34. Part of the laser beam is reflected by the half mirror 70 and guided in the horizontal direction and the other part of the laser beam is transmitted therethrough. A first mirror 71 is inclined by an angle of 45° and disposed parallel to the half mirror 70. The laser beam reflected by the half mirror 70 is reflected vertically downward by the first mirror 71. Second and third mirrors 72 and 73 are disposed below the half mirror 70 and the first mirror 71. The second mirror 72 is inclined by 45° with respect to the optical axis of the convex lens 34 and perpendicular to the half mirror 70. The third mirror 73 is inclined by an angle of 45° with respect to the half mirror 70 and the first mirror 71. The laser beam which is transmitted through the half mirror 70 is reflected by the second mirror 72 and guided to the second focusing lens 37. Thus, the laser beam which is reflected by the first mirror 71 is reflected again by the third mirror 73. This reflected laser beam is guided to the first focusing lens 36. These laser beams guided to the first and second focusing lenses 36 and 37 are radiated on the first magnetic recording tape 11 which is driven along the outer circumference of the rotary drum 21 through the windows 38 and 39 in the same manner as in the first embodiment. Thus, the signal is recorded on the first recording tape 11 in the indented pattern.

In the above modification, the reflectivity of the half mirror 70 is preferably larger than transmissivity thereof. Thus, the intensity of the laser beam which is reflected by the second mirror 72 and incident on the second focusing lens 37 becomes the same as that of the laser beam which is reflected by the first and third mirrors 71 and 73 and incident on the first focusing lens 36. With a different arrangement of the half mirror 70 and the first to third mirrors 71 to 73, the length of the optical path between the half mirror 70 and the first focusing lens 36 may be set to be equal to that between the half mirror 70 and the second focusing lens 37. The indented patterns on the adjacent recording tracks of the first magnetic recording tape 11 are formed in the same conditions, thus achieving excellent magnetic transfer recording.

In the above embodiment, the indented pattern is formed by directly radiating the laser beam on the first magnetic recording tape 11. However, the laser beam may be radiated on a base body on which a non-magnetic body layer comprising a photoresist film or a metal film such as tellurium to form the indented pattern. Thereafter, a chemical process such as chemical vapor deposition may be performed to form a magnetic body layer and the first magnetic recording tape.

In the above embodiment, the laser beams modulated by the signal to be recorded are split into two slit beams by the optical system within the rotary drum and radiated on the magnetic recording tape. However, the modulated laser beams may be split into at least three slit beams and radiated on the magnetic recording tape.

Further, in the above embodiment, in order to convert the laser beam to a beam the section of which is of the ellipitical shape, the optical element is the cylindrical lens. However, for the same purpose, a slit may be used as the optical element. In this case, the longitudinal direction of the slit may be inclined by a predetermined angle with respect to the optical axis extending from the light splitting means to the focusing lens. Thus, the adjacent tracks of the indented pattern on the first magnetic recording tape 11 have different azimuths.

Figure 8:
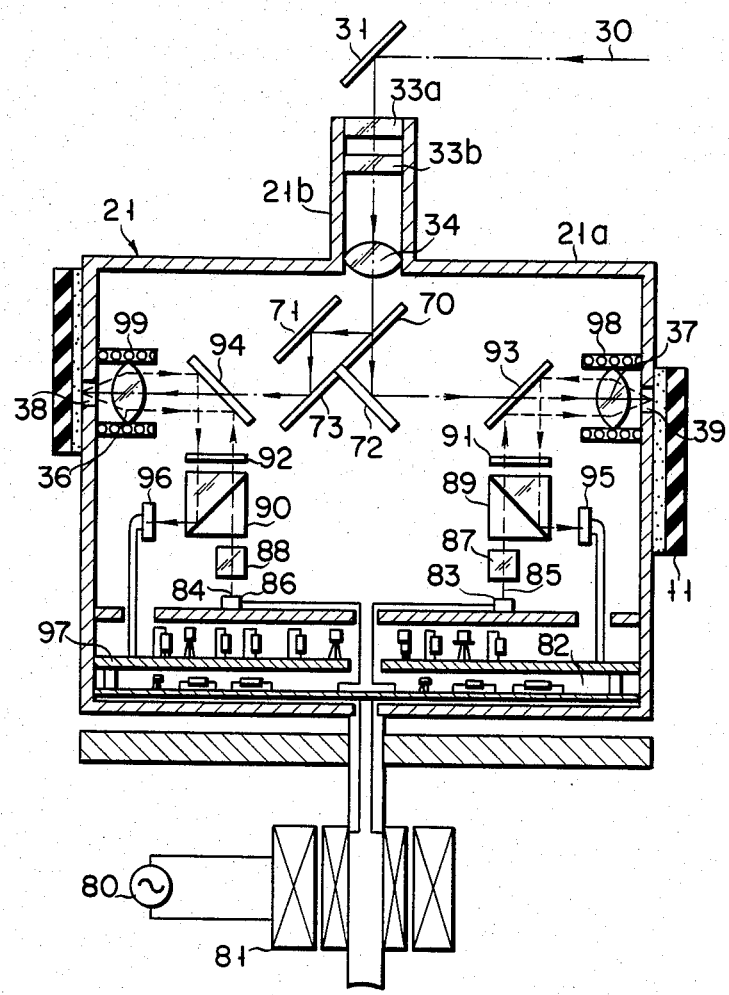
FIG. 8 is a sectional view of a rotary drum of an optical recording device according to still another embodiment of the present invention.

An optical recording device according to another embodiment of the present invention will be described with reference to FIGS. 8 to 11. This optical recording device has substantially the same structure as that shown in FIG. 7, and the detailed description thereof will be omitted. Instead, a focus control unit for controlling the focal points of the first and second focusing lenses 36 and 37 will be described in detail. Referring to FIG. 8, reference numeral 80 denotes an AC power source which supplies AC power to a power source circuit 82 in the rotary drum 21 through a rotary transformer 81 mounted to the rotating shaft of the rotary drum 21. The power source circuit 82 rectifies an AC voltage to a DC voltage and supplies it as a DC drive voltage to semiconductor lasers 83 and 84. Laser beams 85 and 86 emitted from the semiconductor lasers 83 and 84 are collimated by collimators 87 and 88 and transmitted through beam splitters 89 and 90. These laser beams (linearly polarized light beams) 85 and 86 are circularly polarized by quarter-wave plates 91 and 92. These beams are then reflected by dichroic mirrors 93 and 94. At this time, the laser beams 85 and 86 become incident on the focusing lenses 36 and 37 along optical axes which are slightly deviated from the optical axis of the recording laser beam 30. When the focal points of the first and second focusing lenses 36 and 37 are on the surface of the first magnetic recording tape 11, the laser beams 85 and 86 are reflected by the first magnetic recording tape 11 and circularly polarized in a direction opposite to the previous circular polarization. These polarized laser beams 85 and 86 are incident on the first and second focusing lenses 36 and 37 again and reflected by the dichroic mirrors 93 and 94, respectively. Further, the laser beams 85 and 86 are linearly polarized by the quarter-wave plates 91 and 92 again, respectively. These polarized laser beams which are perpendicular to the original laser beams which are originally incident on the beam splitters 89 and 90 become S polarized laser beams and are reflected by the beam splitters 89 and 90, respectively. The reflected laser beams are then received at optical sensors 95 and 96 for detecting defocusing.

Figure 9A:
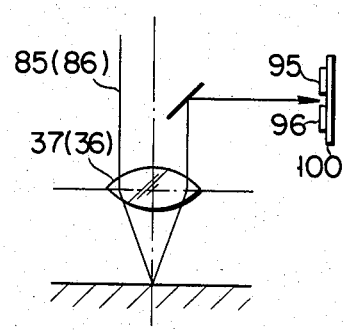
Figure 9B:
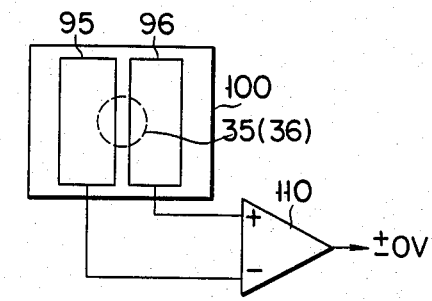
Figure 10A:
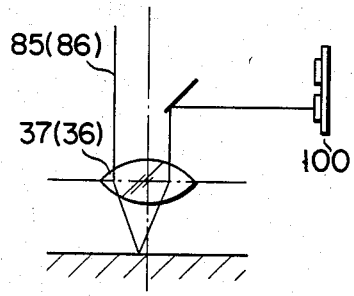
Figure 10B:
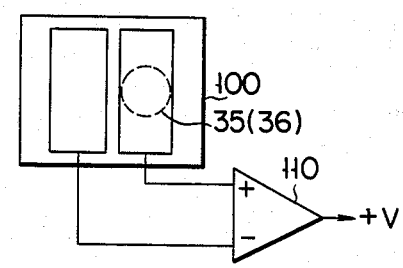
Figure 11A:
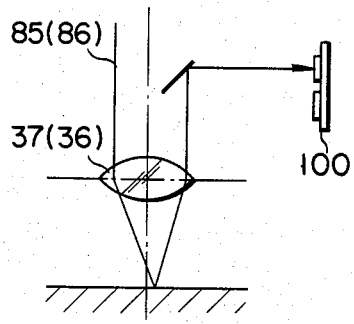
Figure 11B:
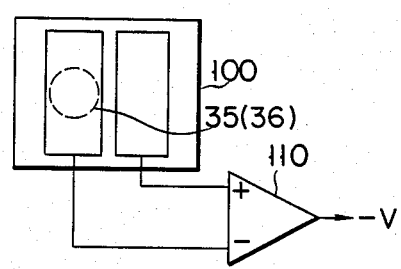

The optical sensors 95 and 96 constitute an optical sensor 100 for detecting two slit beams, as shown in FIGS. 9A to 11B. When the first and second focusing lenses 36 and 37 are located so that the laser beams 30 are properly focused on the first magnetic recording tape 11, the optical sensors 95 and 96 of the sensor 100 for the two slit beams equally receive the laser beams 85 and 86, respectively, as shown in FIGS. 9A and 9B. Therefore, when outputs from the optical sensors 95 and 96 are output to an AND circuit 110, an output from the AND circuit 110 becomes 0 V. However, as shown in FIGS. 10A and 10B, when the first and second focusing lenses 36 and 37 come close to the first magnetic recording tape 11, the output difference between the optical sensors 95 and 96 is measured at a positive voltage. On the other hand, as shown in FIGS. 11A and 11B, when the first and second focusing lenses 36 and 37 are located farther from the first magnetic recording tape 11, the output difference between the optical sensors 95 and 96 is measured to be negative voltage.

A focus servo circuit 97 receives the DC drive voltage from the power source circuit 82. The focus servo circuit 97 supplies a drive signal to focus mechanisms 98 and 99 of the voice coil type which support the first and second focusing lenses, respectively, so as to set the output difference of the optical sensors 95 and 96 of the sensor 100 for detecting the two slit beams to 0 V.

According to the optical recording device with the above arrangement of the second embodiment, the first and second focusing lenses 36 and 37 are controlled so as to optimally focus the laser beam 30 on the first magnetic recording tape 11. As a result, the indented pattern (depth and dimensions) corresponding to the signal to be recorded is controlled to be constant.

In the above embodiment, each focus control unit has each semiconductor laser. However, the laser beam from a single semiconductor laser may be slit into two beams by the half mirror or the like and these two beams may be used for the same purpose.

Further, the laser beams from the semiconductor lasers used in the focus control operation are radiated on the recording medium along the optical axes slightly deviated from the optical axes of the focusing lenses, respectively. The out of focus is defined as a deviation between the optical axes of the beams reflected on the first magnetic recording tape 11. This deviation is detected by the optical sensors 95 and 96 for detecting the out of focus. However, the detecting means for detecting the out of focus may have a structure as shown in FIGS. 12A to 12E, respectively.

Figure 12A:
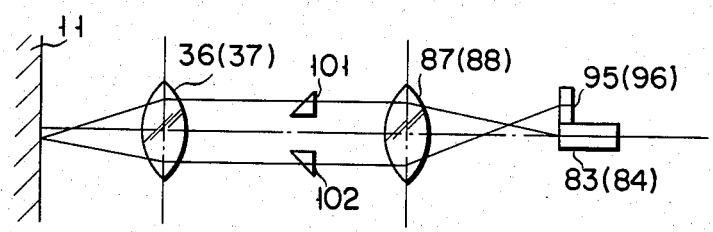
FIGS. 12A to 12E are views of modifications of the focus control device, respectively.

FIG. 12A shows a detecting system which is similar to that in the above embodiment. A laser beam from the semiconductor laser is radiated on the surface of the first magnetic recording tape 11 along an optical axis of the incident laser beam through a rectangular prism 101 disposed on the optical axis thereof. This optical axis is close and parallel to the optical axis of the focusing lens. The laser beam reflected by the magnetic recording tape 11 is received by the optical sensor 95 (or 96) through a rectangular prism 102 disposed on the optical axis of the reflected laser beam. The out of focus is detected by the optical sensors 95 and 96 as a change in the incident positions of the reflected laser beams on the rectangular prism 102.

Figure 12B:
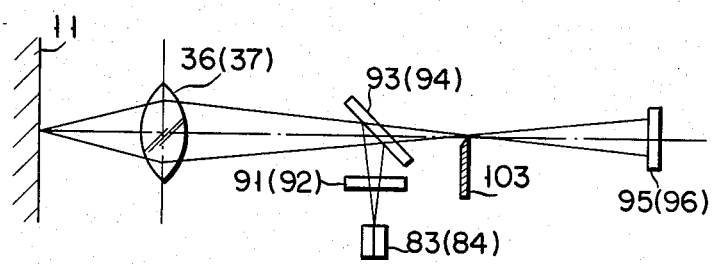
Figures 13A, 13B, 13C, 13D:
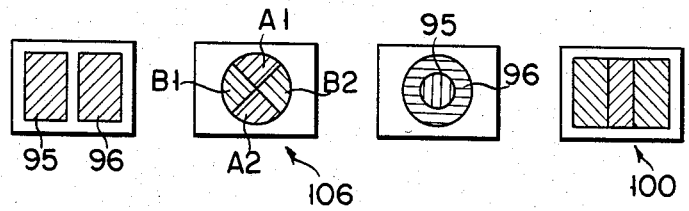
FIGS. 13A to 13D are views of modifications of a detection sensor, respectively.

Referring to FIG. 12B, a knife edge 103 is disposed on the focusing surface of the first and second focusing lens 36 or 37. At the same time, the optical axis of the laser beam from the semiconductor laser 83 or 84 is aligned with the optical axis of the first focusing lens 36 or the second focusing lens 37. In this case, when the focal points of the first and second focusing lenses 36 and 37 are on the first magnetic recording tape 11, the laser beams reflected by the first magnetic recording tape 11 are equally incident on the optical sensors 95 and 96, respectively, as shown in FIG. 13A. Thus, an output difference between the optical sensors 95 and 96 is measured to be 0 V. In the same manner as described in the above embodiment, when the out of focus occurs, that is, when the first and second focusing lenses 36 and 37 are away from the surface of the first magnetic recording tape 11, the knife edges 103 block the laser beams guided from the focal points to the optical sensors 95 and 96. Thus, the output difference between the optical sensors 95 and 96 is measured to be a negative voltage. On the other hand, when the first and second focusing lenses 36 and 37 come close to the surface of the first magnetic recording tape 11, the laser beams guided to the focal points are blocked by the knife edges 103. Thus, the output difference between the optical sensors 95 and 96 is measured to be a positive voltage. The out of focus is thus detected.

Figure 12C:
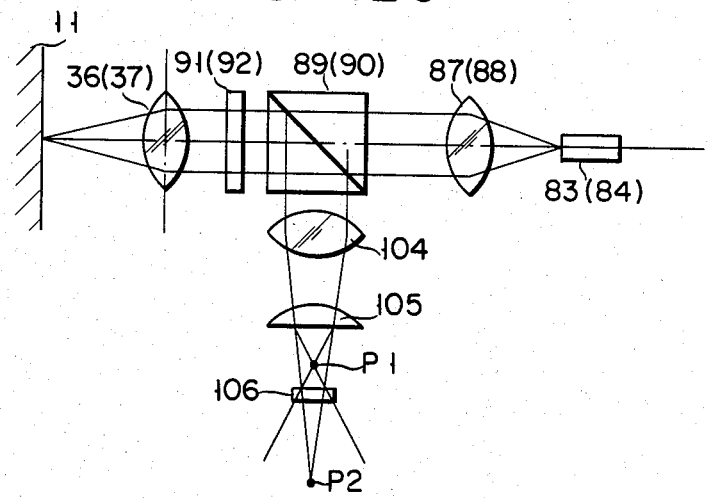

FIG. 12C shows a system which detects with the optical sensors the out of focus as a change in the laser beam spots. In this case, the optical axis of the laser beam from the semiconductor laser 83 or 84 is aligned with the optical axis of the first or second focusing lens 36 or 37. A cylindrical lens 105 for astigmatism and a lens 104 are disposed in the optical path of the laser beam which is reflected by the beam splitter 89 or 90. An optical sensor 106 for detecting four slit beams is disposed between focal planes P1 and P2 of the lens 104 and the cylindrical lens 105, as shown in FIG. 12. With this arrangement, when the focused laser beam is incident on the optical sensor 106, it is incident equally on four sensors A1, A2, B1 and B2. If the laser beam is out of focus, it is incident only on the sensors A1 and A2 or the sensors B1 and B2 in accordance with the direction of deviation of the laser beam. Therefore, according to output states of a pair of sets of sensors A1, A2, B1 and B2, respectively, the out of focus and the direction of the deviation of the laser beams are detected.

Figure 12D:
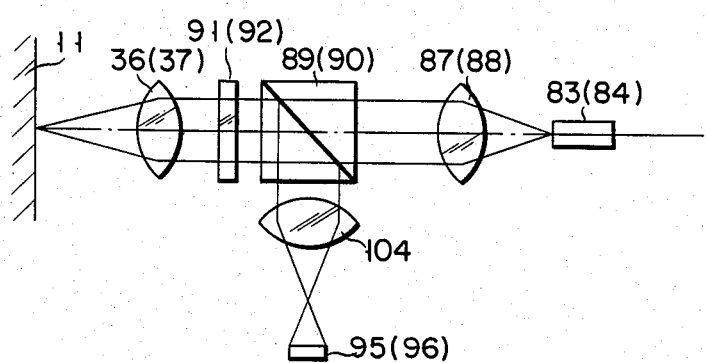
Figure 12E:
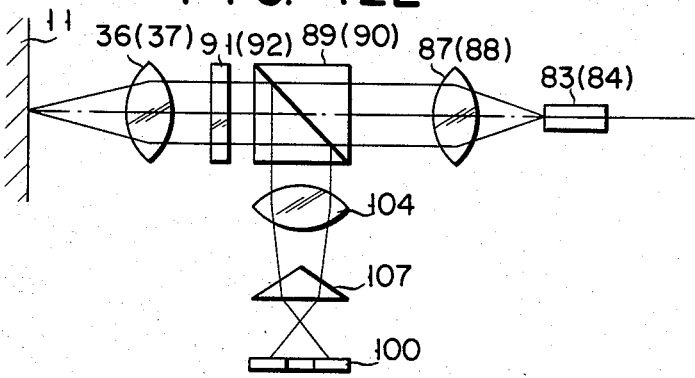

FIGS. 12D and 12E are modifications of FIG. 12C. The out of focus is detected by a change in the reflected laser beam spots. Referring to FIG. 12D, the cylindrical lens 105 of FIG. 12C is removed and coaxial sensors for detecting the two slit beams, as shown in FIG. 13C are used instead of the optical sensors 95 and 96. Further, referring to FIG. 12E, a triangular prism 107 is used in place of the cylindrical lens 105 of FIG. 12C and an optical sensor for detecting three slit beams as shown in FIG. 13D is used instead of the optical sensor 100.

In the above embodiment, the rotary transformer is used as the drive voltage supplying means for supplying the drive voltage to the focus servo circuit and the semiconductor laser of the focus control unit. Further, the AC voltage from the rotary transformer is supplied to the rotary drum and converted to the DC voltage by the power source circuit. However, a slip ring mechanism instead of the rotary transformer may be used and the DC voltage may be directly supplied to the focus servo circuit and the semiconductor lasers.

Further, in the above embodiment, the focus mechanism of the voice coil type is used. However, a focus mechanism of the linear motor type may be used.

What we claim is:

1. An optical recording device for forming recording tracks of an indented pattern on a magnetic recording tape, comprising:
    a rotary drum which has a circumferential wall having at least two windows and which is free to rotate about a rotating axis thereof, the magnetic recording tape being driven obliquely on said windows along an outer surface of the circumferential wall,
    means for supplying a laser beam modulated by a signal to be recorded, and
    an optical system, disposed inside the rotary drum, for converting the laser beam incident on said optical system into at least two slit beams, major axes of sections of which form a predetermined angle and for emitting the slit beams on the magnetic recording tape through said windows, whereby said recording tracks of the indented pattern in correspondence with the signal are formed obliquely on the magnetic recording tape with respect to a longitudinal direction of the magnetic recording tape by the slit beams so as to form different azimuths between adjacent recording tracks.

2. A device according to claim 1, wherein said optical system comprises an optical member for converting the laser beam incident on the rotary drum to the slit beams, beam splitter means for splitting the slit beams converted by said optical member into at least two layer beams and for guiding the respective laser beams to said windows, and at least two focusing lenses for focusing the slit beams from said beam splitter means on the magnetic recording tape through said windows, whereby said optical member shapes the incident laser beam so that the major axes of the slit beams are inclined by a predetermined angle with respect to a direction of the laser beam which emerges from said beam splitter means and becomes incident on said focusing lenses.

3. A device according to claim 2, wherein said optical member has a cylindrical lens.

4. A device according to claim 3, wherein said rotary drum has a cylinder which extends along the rotating shaft of said rotary drum and which has said cylindrical lens.

5. A device according to claim 4, wherein said beam splitter means is disposed on the rotating shaft of said rotary drum and splits the slit beams guided from said cylindrical lens into at least two layer beams perpendicularly to the rotating shaft of said rotary drum.

6. A device according to claim 5, wherein said windows are a pair of windows disposed at an angular interval of 180° on the circumferential wall of said rotary drum.

7. A device according to claim 6, wherein said beam splitter means comprises a mirror, a laser beam splitter disposed between said mirror and said cylindrical mirror, and a quarter-wave plate disposed between said mirror and said beam splitter, whereby said beam splitter splits the laser beam incident from said cylindrical lens into a beam which is directly guided to one of said focusing lenses and a laser beam which is guided to said mirror through said quarter-wave plate and to the other focusing lens.

8. A device according to claim 7, wherein said beam splitter, said quarter-wave plate and said mirror are disposed on the rotating shaft of the rotary drum.

9. A device according to claim 6, wherein said beam splitter means comprises a half mirror which reflects one slit beam from said cylindrical lens and transmits the other slit beam from said cylindrical lens, a first mirror which reflects the transmitted beam transmitted through said half mirror toward the direction of one of said focusing lens, a second mirror which reflects the layer beam reflected by said half mirror, and a third mirror which reflects the laser beam reflected by said second mirror toward the other focusing lens.

10. A device according to claim 9, wherein a reflectivity of said half mirror is larger than a transmissivity thereof.

* * * * *